March 9, 1965 C. MONIN 3,173,027

BISTABLE SWITCHING DEVICE EMPLOYING AN OSCILLATOR RENDERED CONDUCTIVE UPON RECEIPT OF SIGNAL TO BE TRANSFERRED

Filed Feb. 13, 1962

INVENTOR
Claude Monin
By Paul M. Craig Jr.
ATTORNEY

United States Patent Office 3,173,027

Patented Mar. 9, 1965

3,173,027

BISTABLE SWITCHING DEVICE EMPLOYING AN OSCILLATOR RENDERED CONDUCTIVE UPON RECEIPT OF SIGNAL TO BE TRANSFERRED

Claude Monin, Villennes-sur-Seine, France, assignor to Compagnie Industrielle des Telephones, Paris, France Filed Feb. 13, 1962, Ser. No. 172,964
Claims priority, application France, Mar. 8, 1961, 854,958
7 Claims. (Cl. 307—88.5)

The invention concerns a device which is capable of switching a low-frequency signal, such as a telephone conversation current.

It has for its object to provide a switching device which utilises the bistable property of some oscillator circuits, that is to say, the capacity either to oscillate or to remain at rest, while retaining the same values of the voltages applied to the terminals of the circuit.

The invention is concerned with a bistable switching device whose two permanent operative and inoperative states are controlled by pulses, the inoperative state presenting a high impedance for low-frequency currents and the operative state presenting a low impedance for these same currents, characterised by the fact that it comprises in series in the low-frequency circuit an oscillator device consisting essentially of a transistor and of a high-frequency transformer, and in parallel with the terminals of the oscillator device an impedance of low value for the current of the oscillator and of high value for the low-frequency current to be switched.

The said impedance consists, for example, of an appropriately chosen condenser. Thus, the low-frequency circuit is substantially closed when the oscillator device is operative and open when it is inoperative.

The frequency of the oscillator is high in relation to that of the low-frequency signal to be switched.

The features of the invention will become clearly apparent from the description thereof which is hereinafter given with reference to the accompanying drawing, which shows by way of non-limiting example one constructional form of the device according to the invention.

Figure 1:
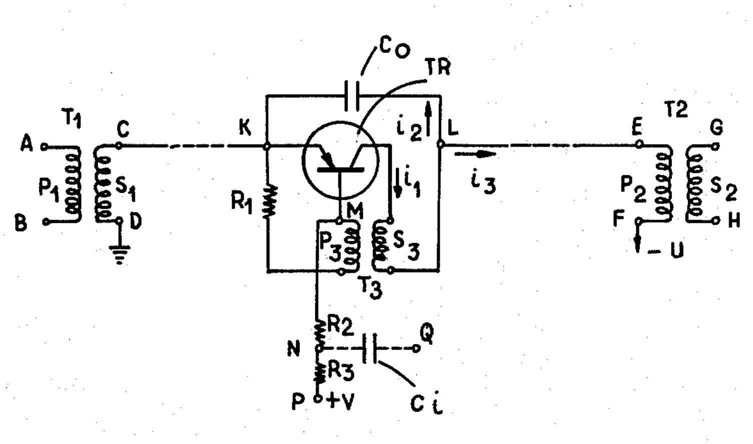
FIGURE 1 illustrates a switching device in accordance with the teachings of the instant invention.

The low-frequency current to be switched arrives at the terminals A and B of the primary winding $P_1$ of a transformer $T_1$ and leaves by way of the terminals G and H of the secondary winding $S_2$ of a transformer $T_2$. The secondary winding $S_1$ of the transformer $T_1$ has its terminal D connected to earth and the current is taken up at the other terminal C of the secondary winding $S_1$, which is in turn connected to the input terminal K of the switching device according to the invention. The output L of the switching device is connected to the input E of the primary winding $P_2$ of the transformer $T_2$, the other end F of the primary winding $P_2$ of which is connected to a negative potential —U. The switching device proper is connected between the points K and L and therefore in series with the secondary winding $S_1$ of the transformer $T_1$ and the primary winding $P_2$ of the transformer $T_2$. It comprises essentially a transistor TR and a high-frequency transformer $T_3$. The imput point K of the switching device is common to three branches, of which the first branch is connected to the output point L of the switching device through a condenser $C_0$, the second branch is also connected to the point L through the emitter and the collector of the transistor TR, the collector comprising in series the winding $S_3$ of the high-frequency transformer $T_3$, and finally the third branch connects the point K to the base M of the transistor TR through a resistance $R_1$ and the winding $P_3$ of the transformer $T_3$.

The base M of the transistor is also connected to a potential +V through two resistances $R_2$ and $R_3$ in series.

The point N common to the two resistances $R_2$ and $R_3$ may also be connected to a point Q through a condenser $C_i$, it being possible for the point Q to be connected, as desired, to a positive or negative pulse source.

The low-frequency current to be switched arrives at the terminals A and B of the transformer $T_1$ and it must be switched to the terminals G and H of the transformer $T_2$. The device according to the invention performs the function of a circuit breaker disposed between the points C and E, i.e. it has two controllable stables states, one of which corresponds to the oscillating transistor TR and the other to the non-conductive transistor TR. If the transistor TR is of the PNP-type, the transistor TR is non-conductive in the inoperative state, its emitter being connected to earth, while its base is connected to the potential +V, which is positive in relation to earth.

If there is applied to the point Q a negative pulse whose potential in relation to zero potential is, in absolute value, greater than the potential V, the base M of the transistor thus assumes a negative potential which is consequently lower than the potential of the emitter, and the transistor TR becames conductive.

When the transistor becomes conductive, the oscillations are set up and are sustained by the low-impedance circuits, i.e. on the one hand by the collector of the transistor, the winding $S_3$ of $T_3$, the condenser $C_0$ and the emitter, and on the other hand by the base of the transistor, the winding $P_3$ of the transformer $T_3$, the resistance $R_1$ and the emitter, the two circuits being coupled by the transformer.

After disappearance of the negative pulse, the pulses are sustained although the continuous potential applied to the base is positive in relation to the potential of the emitter.

The condenser, which was at the voltage —U before the oscillations, is therefore almost short-circuited by the transistor during each half-cycle.

In the operative state, the transistor therefore oscillates at the frequency of the current of the oscillator. As indicated in FIGURE 1, the current $i_1$ is the current which passes through the collector branch of the transistor TR and consequently is the only current which flows in the winding $S_3$ of the transformer $T_3$. The current $i_2$ is the current which flows through the condenser $C_0$ and the current $i_3$ is the utilizable output current.

When it is desired to restore the device to the inoperative state, it is sufficient to apply to the point Q a pulse which is sufficiently positive to destroy the existing state of equilibrium. The transistor is then again blocked, the low-frequency current is interrupted and the high-frequency oscillations stop, the circuits which supply continuous energy being broken in order to sustain the oscillator.

The transistor is maintained in the non-conductive state by the biases normally applied, i.e. +V at the base and zero potential at the emitter.

The windings of the transformers $S_1$ of $T_1$ and $P_2$ of $T_2$ are such that their impedances are high in relation to the impedance offered by the condenser at the frequency of the current of the oscillator.

As has been set forth hereinbefore, the impedances of the windings $S_1$ of the transformer $T_1$ and $P_2$ of the transformer $T_2$ are of low value for the low-frequency currents, but would be very high for the high-frequency current of the oscillator. Conversely, the impedance offered by the condenser $C_0$ is very low for the high frequency current of the oscillator and is very high for the low frequency input currents. In the part of the device constituted by the emitter, the collector and the winding $S_3$ of the transformer $T_3$, there is a super-imposition of the oscillator current and the low frequency input current.

The transformer $T_3$ has no special peculiarities; however, its coefficient of self-induction is low so as not to oppose the passage of the high frequency.

Figure 2:
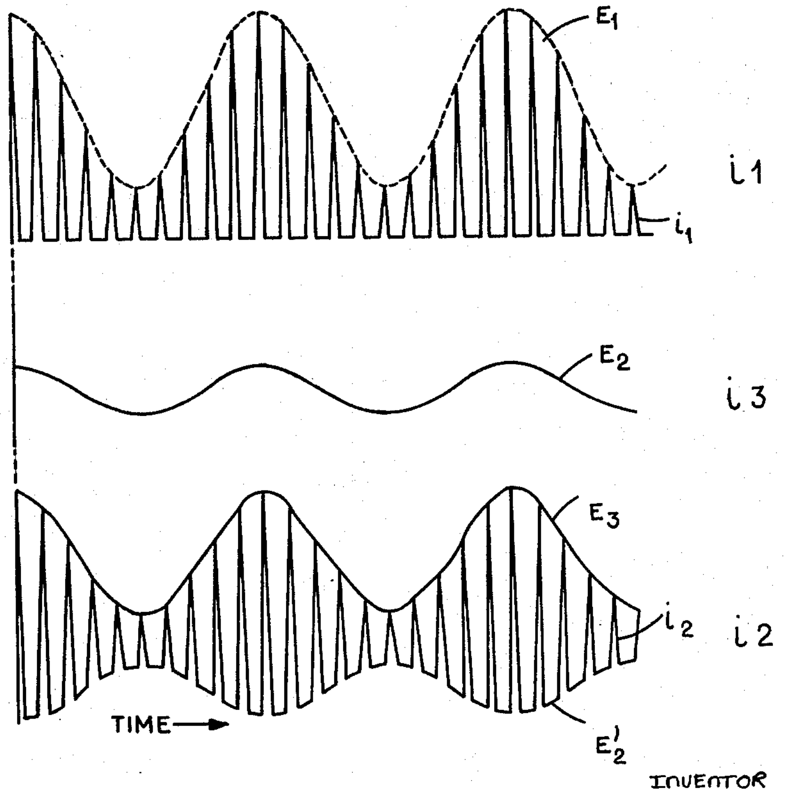
FIGURE 2 represents the general form of the currents in different portions of the device illustrated in FIGURE 1 during operation thereof.

The current $i_1$ of the FIGURE 2 is obtained by the superimposition of the high frequency current of the oscillator with the low frequency input current under the following conditions. The transistor, oscillating at the frequency of the high frequency current, becomes conductive at each positive cycle of this current, but supplies a zero current for the negative cycles. If to these positive circles of equal amplitude there is added the low frequency current having a lower amplitude, it is evident that the sum of the two currents will be positive, even during the negative half-cycle of the low frequency current. The resulting current $i_1$ is thus a high frequency current, the ordnance of which is limited by the sinusoid $E_1$ of the low frequency imput current.

The current $i_3$ which is collected at the output of the device has the same frequency as the input curve and as shown in FIGURE 2 is also in phase with that signal. The current $i_2$ is limited downwardly by a curve $E_2$ which is symmetrical and is equal to $i_1-i_3$. The amplitude of the high frequency current is constant within the device since this current cannot be diverted either through the winding $S_1$ or through the winding $P_2$ due to the relative impedances involved. It is therefore apparent that the wave form which passes through transformer $T_2$ will be identical in shape and frequency to the wave form which passes through transformer $T_1$.

Modifications may be made without departing from the scope of the invention, more especially in regard to the device for the transmission of negative or positive pulses through the condenser $C_1$. Means may readily be conceived for influencing an electrode of the transistor other than the base in order to render it conductive or non-conductive.

Likewise, the polarities indicated in the figure are suitable for a junction transistor of the PNP-type. Others could readily be adopted for a transistor of the NPN-type. Likewise, the capacitor $C_0$ provided for the passage of high-frequency current from the oscillator and for blocking the low-frequency current could be replaced by any other system performing an analogous function.

I claim:

1. A bistable switching device having an input and an output comprising, a transistor having an emitter, a base and a collector, said emitter being connected to said input, a transformer having a circuit including a pair of windings connected to said transistor coupling said output to said input to form a bistable oscillator, a condenser connected between said imput and said output, and bias voltage means selectively connected to the base of said oscillator for rendering it conductive to the signal applied to said input terminal, said collector being connected to said output through one of said windings and said base being connected to said input through the other of said windings.

2. Device according to claim 1, wherein the input terminal of the switching device is connected to the emitter of the transistor and to a first fixed bias, the output terminal being connected to the collector of the transistor through a first winding of the transformer and to a second fixed bias, the base of the transistor being connected to the emitter through a second winding of the transformer in series with a resistance and to a third fixed bias.

3. Device according to claim 2, wherein the base of the transistor is connected to a fixed bias through two resistances in series, the point common to these two resistances being adapted to receive pulses having polarities and values such that they determine a change of state of the transistor, a pulse of opposite direction to the fixed bias rendering it conductive if it was in the inoperative state and a pulse of the same direction as the fixed bias rendering it non-conductive if it was in the operative state.

4. A bistable switching device according to claim 1, wherein said current produced by the oscillator has a high frequency with respect to the frequency of the current to be switched and the condenser connected between the input and the output of the device constitutes a low impedance for the current of the oscillator and a very high impedance for the current to be switched.

5. A bistable switching device comprising a transistor having an emitter, a base and a collector, a transformer having a secondary which is connected in series with the collector of said transistor and the primary of which is connected between the emitter and the base of said transistor, a condenser connected between the emitter of the transistor and the output of the secondary of the transformer, the two terminals of the condenser forming the input and the output of the device, the signal to be transmitted being applied to the imput of the device, and the control signal being applied to the base of the transistor.

6. A bistable switching device according to claim 5, in which the base of said transistor is connected to a positive potential higher than that to which the emitter of said transistor is connected, the output of the device being conneced to a negative polarity source of voltage and the emitter being connected to ground.

7. A bistable switching device according to claim 6, in which the base of said transistor is connected permanently through two resistances in series with a positive potential higher than that to which the emitter is permanently connected, the output of the device being connected through an inductance to said negative polarity source of voltage and said emitter being connected through an inductance to ground, and means for applying a negative impulse temporarily to the base of the transistor so that the device begins to oscillate permitting passage of the signal at said input to said output until the device is rendered non-conducting by temporary application of a positive impulse from said means to the base of said transistor.

References Cited in the file of this patent

UNITED STATES PATENTS

| | | |
|---|---|---|
| 2,961,553 | Giger | Nov. 22, 1960 |
| 2,992,341 | Andrews et al. | July 11, 1961 |